April 30, 1963 E. W. MANTEUFFEL 3,088,065

SELF-REGULATED STATIC FREQUENCY CONVERTER

Filed Sept. 12, 1958

Inventor:
Erich W. Manteuffel,
by Allen E. Amgott
His Attorney.

United States Patent Office 3,088,065
Patented Apr. 30, 1963

3,088,065
SELF-REGULATED STATIC FREQUENCY CONVERTER

Erich W. Manteuffel, Ithaca, N.Y., assignor to General Electric Company, a corporation of New York

Filed Sept. 12, 1958, Ser. No. 760,712
4 Claims. (Cl. 321—2)

This invention relates to converters and more particularly to self-regulated frequency converters that are capable of supplying output voltages having constant frequency.

For many applications it is desirable to operate apparatus such as high-speed magnetic amplifiers from a source having a higher frequency than is available from conventional 60 cycle or 400 cycle rotating A.-C. generators. Further, it is important that such higher frequency remain constant regardless of external influences that may occur during circuit operation.

One way of obtaining such high-frequency voltage is to employ a static frequency converter sometimes referred to as a frequency multiplier. Converters of this type utilize magnetic devices which have excellent reliability. However, such devices also have certain disadvantages, namely, the power factor is low and decreases considerably when large ratios of output-to-input frequencies are obtained, the weight and volume are large for large frequency conversion ratios and, the output voltage changes considerably with load variations. Stabilizing devices have been used to reduce this load dependency but such devices tend to decrease the overall power factor and increase the weight.

One object of the present invention is to overcome the aforesaid shortcomings of prior art frequency converters.

Another object is to provide an improved self-regulated static frequency converter capable of supplying power to high-speed magnetic amplifiers.

A further object is to provide a reliable, self-regulated static frequency converter that supplies an output voltage of constant frequency.

A still further object of the invention is to provide a frequency converter having a large frequency conversion ratio that is light in weight and small in volume, having a higher power factor than frequency multipliers using magnetic circuitry throughout.

Still another object of the invention is to provide apparatus for obtaining an output frequency that is independent of input frequency, input magnitude, ambient temperature and load.

Figure 2:
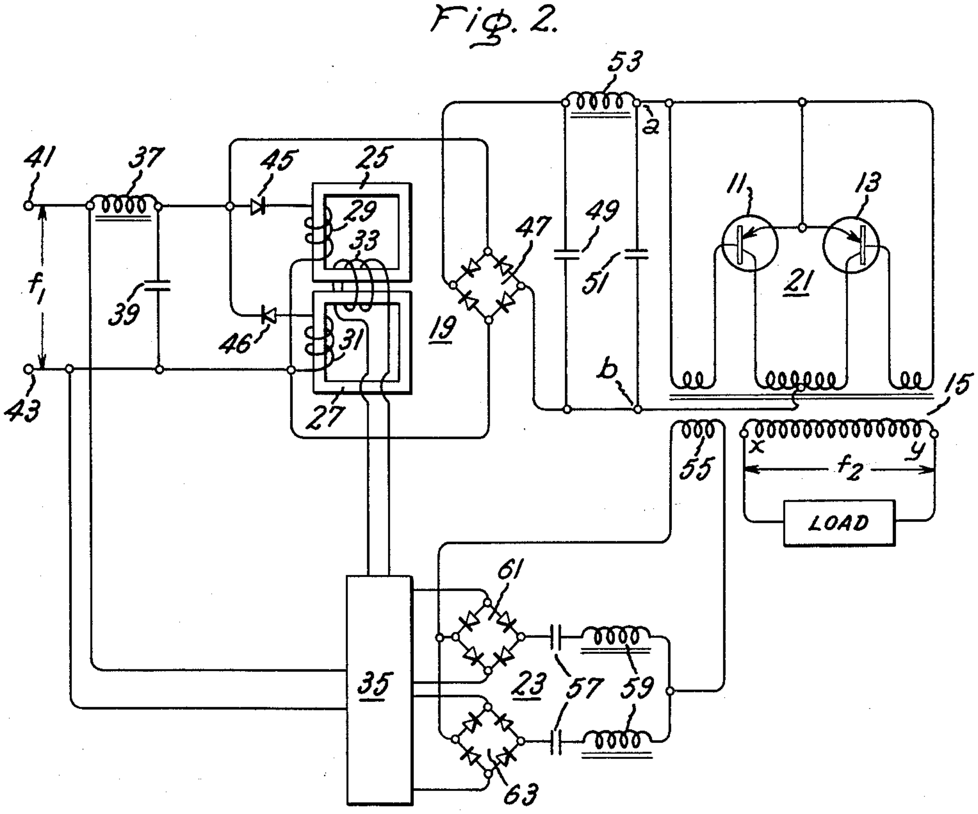
Figure 1:
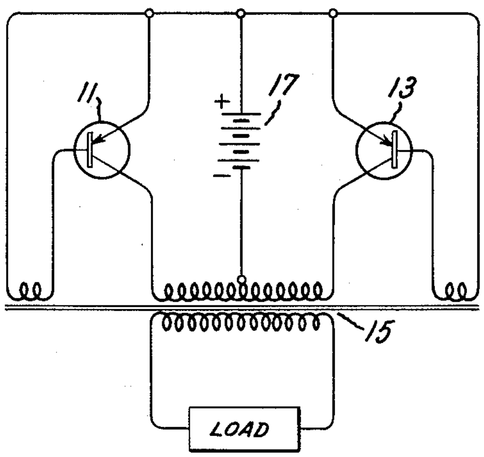

Other objects and many of the attendant advantages of this invention will be readily appreciated as the same becomes better understood by reference to the following detailed description when considered in connection with the accompanying drawings wherein:

FIGURE 1 is a schematic wiring diagram of a switching transistor D.-C. to A.-C. converter having an output frequency proportional to the magnitude of the D.-C. input voltage, and FIGURE 2 is a schematic wiring diagram of one embodiment of a self-regulated static frequency converter.

In FIGURE 1 there is shown a switching transistor D.-C. to A.-C. converter having an output frequency that is proportional to the D.-C. input voltage. Such circuit has been reported in the literature and consists of two switching transistors 11 and 13, a saturating reactor or transformer 15 and a suitable source of D.-C. voltage 17 connected as shown. However, this circuit will not provide a constant frequency output with a constant potential D.-C. input because temperature variations in the magnetic core will cause the saturation flux density to change and, thus, the output frequency will also change. In addition, load variations are reflected to the primary of saturating transformer 15 and will cause the output frequency to change. In order to maintain the frequency constant under all conditions, the D.-C. input voltage source would have to be properly controlled.

Such a transistor converter can be adapted to provide a self-regulated frequency converter capable of supplying output voltages of constant frequency. In brief, this invention teaches a self-regulated, static frequency converter comprising a switching transistor converter in combination with a ferroresonant magnetic amplifier. A voltage source is used as a variable potential to control the frequency of the switching transistor converter. Feedback means including a plurality of series-resonant circuits permits regulation of the D.-C. input to said converter. The ratio of the output to input frequency can be made very large without effecting the output frequency. An inherent feature of this invention is that natural temperature compensation is accomplished by means of the magnetic circuitry.

In FIGURE 2 there is shown one embodiment of a self-regulated, static frequency converter illustrating the invention. This circuit includes a ferroresonant magnetic amplifier 19 in combination with a switching transistor converter 21 and feedback means including a plurality of series-resonant circuits 23.

Magnetic amplifier 19 includes a pair of saturable reactors 25 and 27, having A.-C. windings 29 and 31, respectively, and a common control winding 33. Said control winding 33 is connected to the output of a magnetic pre-amplifier 35 which will be described more fully hereinafter. A linear choke coil 37 and a capacitance 39 are serially connected across input terminals 41 and 43 to which an alternating voltage having a frequency $f_1$ is applied to the magnetic amplifier. Winding 29 of saturable reactor 25 has one terminal connected through a rectifying device 45 to one pole of capacitance 39. Winding 31 of saturable reactor 27 has one terminal connected through a rectifying device 46 to one pole of capacitance 39 and the other terminal connected to the other pole of said capacitance.

A bridge rectifier 47 is connected across capacitor 39. Connected to the other terminals of bridge rectifier 47 is a filter network illustrated as having a pi-type configuration comprising capacitances 49 and 51 and linear choke 53. For a more detailed description of the magnetic amplifier 19 see co-pending application Serial No. 543,868, filed October 31, 1955, entitled "Magnetically Regulated Power Supply," in the name of the same inventor and assigned to the same assignee.

A switching transistor converter 21 similar to that of FIGURE 1 is connected across terminals *a* and *b* of capacitance 51 of the filter network. The output frequency $f_2$ appearing at terminals *x* and *y* of the secondary winding of saturable transformer 15 is proportional to the D.-C. voltage appearing across terminals *a* and *b* of capacitance 51.

Feedback means to control this output frequency appearing at terminals *x* and *y* comprise another secondary winding 55, in addition to the secondary winding of transformer 15, coupled to a plurality of series-resonant circuits 23. Each of said series resonant circuits includes a capacitance 57 and a choke 59, one end of each of said chokes being connected in common. Capacitance 57 of said series-resonance circuits are each connected to a bridge rectifier network 61 and 63. One end of winding 55 is connected to the common connection of chokes 59, the other end of said winding being connected to the other input terminals of each of bridge rectifiers 61 and 63.

Magnetic pre-amplifier 35 shown in block form is a conventional, center-tap, magnetic amplifier which includes a saturable reactor pair. Each of the output terminals of bridge rectifier 61 and 63 are connected respectively to a control winding in pre-amplifier 35. Input voltage to pre-amplifier 35 is taken directly from the input voltage appearing at terminals 41 and 43. The output of pre-amplifier 35 is connected to control winding 3 on saturable reactors 25 and 27.

Briefly, the operation of the static frequency converter is as follows: An input voltage having a frequency $f_1$ is fed through linear choke 37 and through rectifiers 45 and 46, respectively, on saturable reactors 25 and 27. The outputs of said saturable reactors appearing on capacitance 39 are controlled by control winding 33 in manner to be described hereinafter. Said output voltage on capacitor 39 is rectified in bridge rectifier 47 and then filtered in the pi-type filter network resulting in a D.-C. voltage appearing across terminals $a$ and $b$ of capacitance 51. Said voltage across terminals $a$ and $b$ is used to supply the necessary voltage to switching transistor converter 21. The output frequency, $f_2$, of said converter 21 appearing at terminals $x$ and $y$ on the secondary winding of saturable transformer 15 is proportional to the D.-C. voltage appearing across terminals $a$ and $b$.

A portion of the output of transistor converter 21 is impressed across winding 55. The output appearing on winding 55 is fed back to the series-resonant circuits 23. One of these series-resonant circuits is tuned to resonate at a frequency slightly lower than the desired output frequency while the other of said series-resonant circuits is tuned to resonate at a frequency slightly higher than the desired output frequency. The resulting currents appearing on each of said series-resonant circuits are rectified in bridge rectifiers 61 and 63, respectively, and the rectified outputs are supplied to the two control windings of magnetic pre-amplifier 35. These two rectified currents cause opposing ampere-turns on pre-amplifier 35. The output of magnetic pre-amplifier 35 is connected to control winding 33 of saturable reactors 25 and 27.

Thus, the signal appearing on control winding 33 is determined by the output frequency of the switching transistor D.-C. to A.-C. converter 21. Any variation of this frequency causes the control signal to vary which in turn changes the D.-C. output voltage of the magnetic amplifier 19 in such a manner that the voltage applied to converter 21 is corrected to bring the frequency back to the desired value. Therefore, the output frequency of the switching transistor D.-C. to A.-C. converter 21 will remain substantially constant. Further the ferroresonant voltage source is inherently insensitive to variations of input voltage, and little regulation is needed to compensate for such variations.

It will become obvious to those skilled in the art that the self-regulated static frequency converter exhibits a certain amount of temperature compensation even though no frequency regulation is used. The saturating flux density of the saturable transformer 15 will decrease with increases in temperature of its core. This will cause an increase in output frequency is mentioned hereinbefore. But since the saturation flux density of the magnetic cores 25 and 27 will also decrease with increases in temperature, the voltage across terminals $a$ and $b$ will be somewhat less. Where the same magnetic material is used for cores 25 and 27 and saturable transformer 15, good internal temperature compensation will result.

While a particular embodiment of the invention has been shown and described herein, it is not intended that the invention be limited to such disclosure, but that changes and modifications can be made and incorporated within the scope of the claims.

What is claimed is:

1. A frequency regulating network comprising a switching transistor converter means for changing a D.-C. voltage to an A.-C. voltage of predetermined frequency and wave shape, an A.-C. voltage source, means for supplying a regulated D.-C. voltage to the input of said converter from the A.-C. source, said supplying means comprising a ferro-resonant circuit means and rectifier means, and feedback circuit means responsive to the A.-C. output voltage of said converter means and connected to said ferro-resonant circuit means for regulating said D.-C. voltage, whereby the frequency and wave shape of the A.-C. output voltage of said converter means are maintained substantially constant.

2. A frequency regulating network, as defined by claim 1, wherein the feedback circuit means comprises: a controllable saturable reactor means for controlling the ferro-resonant circuit means; and, resonant circuit means responsive to the A.-C.-voltage of the converter means for controlling said other saturable reactor means.

3. A frequency regulating network, as defined by claim 2, wherein said resonant circuit means comprises a plurality of resonant circuits, each circuit being tuned to a different frequency.

4. A frequency regulating network, as defined by claim 2, wherein said resonant circuit means comprises a pair of resonant circuits, one circuit being tuned at a frequency a little above the frequency of the converter's A.-C.-voltage, and the other circuit being tuned at a frequency a little below the frequency of the converter's A.-C.-voltage.

References Cited in the file of this patent

UNITED STATES PATENTS

| | | |
|---|---|---|
| 2,776,379 | Sargeant | Jan. 1, 1957 |
| 2,783,380 | Bonn | Feb. 26, 1957 |
| 2,848,614 | Lyons | Aug. 19, 1958 |
| 2,875,351 | Collins | Feb. 24, 1959 |